(12) United States Patent
Kruempelmann (10) Patent No.: US 9,201,700 B2
(45) Date of Patent: Dec. 1, 2015

(54) PROVISIONING COMPUTER RESOURCES ON A NETWORK (75) Inventor: Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 614 days.

(21) Appl. No.: 13/543,900

(22) Filed: Jul. 9, 2012

(65) Prior Publication Data

US 2014/0012988 A1    Jan. 9, 2014

(51) Int. Cl.
 *G06F 15/173*  (2006.01)
 *G06F 9/50*   (2006.01)
 *H04L 29/08*  (2006.01)

(52) U.S. Cl.
 CPC .......... *G06F 9/5044* (2013.01); *H04L 67/1036* (2013.01)

(58) Field of Classification Search
 USPC ........................................................ 709/226
 See application file for complete search history.

(56) References Cited

U.S. PATENT DOCUMENTS

| | | | | |
|---|---|---|---|---|
| 2012/0239792 A1* | 9/2012 | Banerjee | ............. | H04L 67/1097 709/223 |
| 2012/0290348 A1* | 11/2012 | Hackett | ................. | G06Q 10/06 705/7.13 |
| 2013/0290539 A1* | 10/2013 | Kodialam | ............. | G06F 9/5072 709/226 |
| 2014/0379930 A1* | 12/2014 | Ferris | ................. | G06F 9/45533 709/226 |

\* cited by examiner

*Primary Examiner* — Emmanuel L Moise
*Assistant Examiner* — Mahran Abu Roumi (57) ABSTRACT

To provision computer resources on a computing network, for instance a cloud network, an associated resource request parameter of a received resource request is determined. A system attribute is calculated based upon the resource request parameter. Based upon the calculated system attribute, a computing resources repository is queried to retrieve a computing resource. Upon querying, a persisted computing resource with a sufficient capacity to execute a client system process is retrieved. If the computing resources repository does not include a persisted computing resource, an expandable computing resource is retrieved. If the computing resources repository does not include an expandable computing resource, a new computing resource is rendered to execute the client system process. The retrieved computing resource is assigned to the received resource request, and the assigned computing resource is provisioned to execute the client system process.

20 Claims, 4 Drawing Sheets

PROVISIONING COMPUTER RESOURCES ON A NETWORK

TECHNICAL FIELD

The field generally relates to computer systems and software and more particularly to methods and systems to provision computer resources on a network.

BACKGROUND

Business enterprises are increasingly turning to the cloud to provision and consume computing services and complex computing systems. These complex computing systems may be used by clients internal to the business enterprises or external to the business enterprises (e.g., over a private or public cloud). The complex computing systems may include various resources tailored to meet corresponding clients' resource needs. The resources for associated large clients are provisioned based upon an estimated requirement for that large client; and the same provisioning may be universally followed for all other smaller clients too. This method of provisioning causes a significant wastage of resources.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provision one or more computer resources on a computing network are disclosed herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
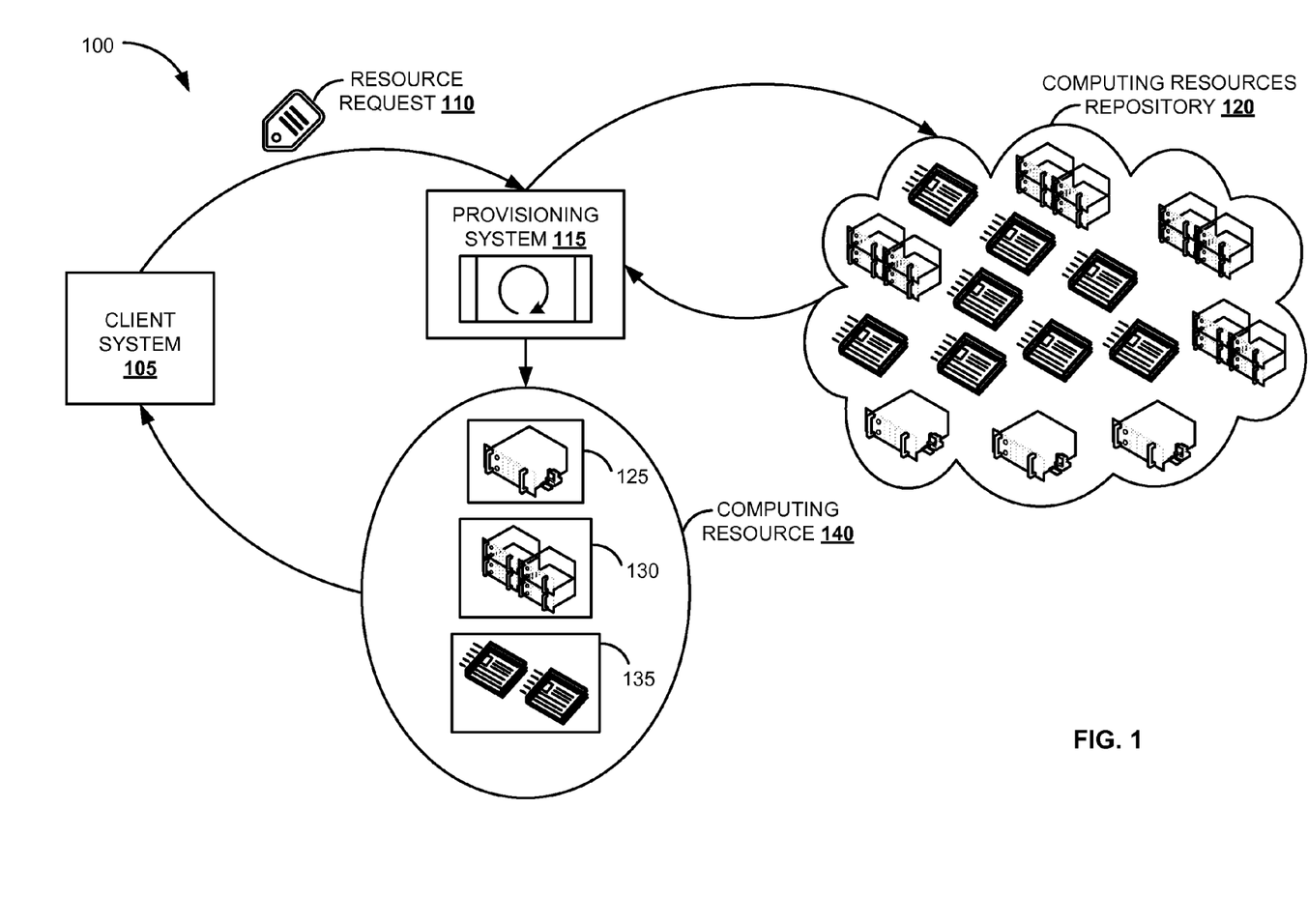
FIG. 1 is a block diagram illustrating an overview of a system to provision one or more computer resources on a computing network, according to an embodiment.

FIG. 1 is a block diagram illustrating an overview of a system to provision one or more computer resources on a computing network, according to an embodiment. A client system process represents a collection of actions or tasks that produce a desired output upon execution. These actions or tasks executed on client system 105 are referred to as client system processes. The client system 105 may not have all the resources needed to execute the client system processes, and in some cases, it may not have any resources needed to execute the client system processes. According to one embodiment, client system 105 may request a provisioning system 115 to get access to the needed resources from computing resources repository 120 (e.g., based on a cloud), as a tenant. Client system 105 initiates resource requests that request additional resources to execute the client system processes.

The additional resources are provisioned by provisioning system 115. Provisioning system 115 is in communication with computing resources repository 120 which includes various computing resources, for instance, servers, local databases, memory elements, local processors, microprocessors, logical units, information files, system devices, business data, tools, applications, plug-ins, and the like, including resource templates. Resource templates facilitate the execution of the client system processes by providing adequate computing resources to client system 105 to execute a client system process. Resource templates are additional resources present in computing resources repository 120, which can be augmented with computing resources to generate corresponding additional resources (for instance, computing resources) with a capacity to execute client system processes. Resource templates are also complied with one another to render a new computing resource. In an embodiment, provisioning system 115 is responsible for provisioning the additional resources including resource templates to client system 105 to execute the client system processes.

In an embodiment, a cloud network represents a collection of various computing resources, including computer applications, computer platforms, computer infrastructures and the like, that are inter connected through a communication channel, to provision the resources to end recipients (for e.g. client system 105) as a service. The provisioning of the service is also known as cloud computing, where the end recipients (for e.g. client system 105) access the resources (for e.g. computing resources) available in computing resources repository 120 via the cloud network to execute corresponding client system processes.

The resource requests include a list of requirements of additional computing resources to execute a corresponding client system process. For instance, a resource request may include a requirement of three local databases and one processor to execute a deployment of a business tool ABC. The resource requests are associated with resource request parameters that represent a list of one or more attributes of the required computing resources. For instance, the required parameters of three local databases is a database capacity of 70 GB (70 Giga Bytes) each, and the required parameter of the processor is 50 MHz (50 Mega Hertz). Resource request parameters may include industry type associated with the resource request parameter, usage data, legal requirements with reference to the client system 105 and its location, and the like.

In an embodiment, client system 105 sends resource request 110 with resource request parameters to provisioning system 115, to request for additional resources. A processor associated with provisioning system 115 receives resource request 110 and calculates one or more system attributes.

Calculating system attributes include determining the resource request parameters associated with resource request 110 and based upon the resource request parameters and the resource request, computing required attributes of the computing resources. For instance, based the resource request and the resource request parameters, system attributes of three local databases of 70 GB capacity each and one processor of 50 MHz speed are calculated. Calculating system attributes may include determining memory element requirements, input-output requirements, central processing unit (CPU) power consumption, and the like for the associated resource request and resource request parameters. For instance, calculating system attributes include calculating CPU power consumption for three local databases of 70 GB capacity each and one processor of 50 MHz speed.

Based upon the system attribute, the processor queries computing resources repository 120 to retrieve a computing resource 140 corresponding to the system attributes. Querying computing resources repository 120 includes analyzing the system attributes, and searching computing resources repository 120 to find one or more system resources that correspond to the system attribute. The processor queries computing resources repository 120 to determine if there is a persisted computing resource 125 with a sufficient capacity to execute a client system process associated with the resource request. Persisted computing resource 125 may be described as a computing resource existing in computing resources repository 120, which has a sufficient capacity corresponding to the calculated system attributes. For instance, persisted computing resource 125 having a capacity of three local databases of 70 GB capacity each and one processor of 50 MHz speed is considered as sufficient and is retrieved from computing resources repository 120. In an embodiment, persisted computing resource 125 having a capacity exceeding the sufficient capacity of three local databases of 70 GB capacity each and one processor of 50 MHz speed may be retrieved if the exact capacity is not available.

If computing resources repository 120 does not include a persisted computing resource with a sufficient capacity to execute the client system process, the processor queries computing resources repository 120 to determine an expandable computing resource 130 to execute the client system process associated with the resource request 110. Expandable computing resource 130 may be described as a computing resource existing in computing resource 140, which can be expanded to become consistent with the calculated system attributes upon augmenting one or more resource templates. For instance, a computing resource having a partial capacity of one local database of 70 GB capacity and one processor of 50 MHz speed, with a potential to expand and include the remaining capacity of two local databases of 70 GB capacity each—represents expandable computing resource 130. Such an expandable computing resource 130 is retrieved from computing resources repository 120.

If computing resources repository 120 does not include an expandable computing resource 130, the processor queries computing resources repository 120 and renders a new computing resource 135 to execute the client system process associated with the resource request 110. Rendering a new computing resource 135 includes determining one or more resource templates with a capacity to execute the client processes associated with the received resource request 110 and generating a resource agent that preserves the resources for client process execution. The resource agent thus generated is rendered as a new computing resource 135 to execute the client system process. The computing resource (for e.g. 125, 130 or 135) thus retrieved is assigned to client system 105, to execute the corresponding client system process.

In an embodiment, if such a resource template is not available, one or more resource templates that will conjointly constitute one local server and one database, is retrieved from computing resources repository 120. For instance, if a first resource template includes one local server, and a second resource template includes one database, both the first and the second resource templates are conjointly assigned as additional resources along with expandable computing resource 130 to execute the client system process. In another embodiment, even though a resource template includes more resources than the system requirement, such a resource template may still be a relevant resource template. For instance, if a first resource template includes two local servers and three databases, a second resource template includes one local server and eight databases, and a third resource template includes two local servers and two databases, none of these resource templates exactly contain the system requirement. However, a most relevant resource template, which in this example is the third resource template, is assigned as an additional resource. In another embodiment, if the system attribute calculated is six local servers and one database, then, one or more resource templates with an ability to execute the client system process independently or conjointly are retrieved from computing resources repository 120.

In an embodiment, the processor is in communication with an indexer, which is configured to perform indexing on one or more computing resources present in computing resources repository 120 based upon one or more corresponding computing resource parameters associated with the computing resources, and store the indices in the indexer. Upon calculating the system attribute, the processor may query the indices in the indexer to retrieve an identification of a corresponding computing resource present in computing resources repository 120 to execute the client system process. Further, based upon the identification of the corresponding computing resource, the processor retrieves the associated computing resource from computing resources repository 120. In an embodiment, querying the indices includes retrieving an identification of a corresponding resource template present in computing resources repository 120 to execute the client process. Based upon the identification of the corresponding resource template, the processor retrieves the associated computing resource from computing resources repository 120.

In an embodiment, rendering a new computing resource includes determining a range of system requirements to construct a corresponding computing resource, calculating one or more combinations of probable system requirements that occur within the range of the system requirements and constructing the corresponding resource templates based upon the combination of the probable system requirements. For instance, a range of system requirement may be six to eight local servers and twelve to sixteen databases. A combination of probable server requirements include six local servers and twelve databases, seven local servers and twelve databases, eight local servers and twelve databases, six local servers and thirteen databases, seven local servers and thirteen databases, eight local servers and thirteen databases, and so on. The corresponding resource templates may be determined from computing resources repository 120. In another embodiment, the corresponding resource templates may be constructed based upon the combinations.

In an embodiment, the resource templates are determined based upon one or more client parameters associated with the resource request. For example, client parameters may describe one or more features of client system 105. Upon querying computing resources repository 120, the resource templates corresponding to the client parameters may be retrieved to execute the client system process. In an embodiment, if there is any failure or non-functioning of any one of the resource templates, the processor determines a substitute resource template to substitute the non-functioning resource template.

Figure 2:
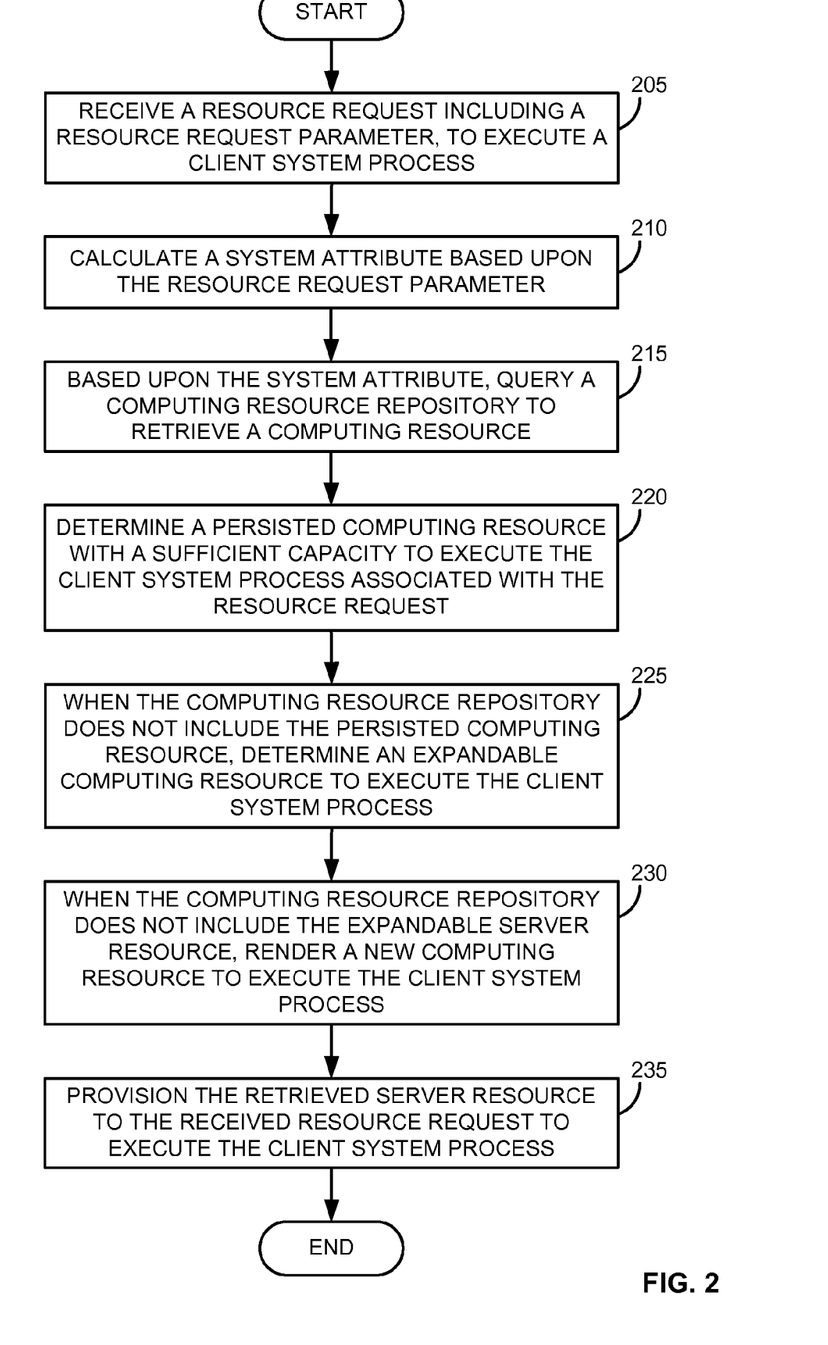
FIG. 2 is a process flow diagram illustrating a computer-implemented method to provision one or more computer resources on a computing network, according to an embodiment.

FIG. 2 is a process flow diagram illustrating a computer-implemented method to provision one or more computer resources on a computing network, according to an embodiment. At process block 205, a resource request including a resource request parameter to execute a client system process is received. At process block 210, a system attribute is calculated based upon the resource request parameter. At process block 215, based upon the calculated system attribute, a computing resources repository is queried to retrieve a computing resource configured to execute the client system process. To execute the client system process associated with the resource request, a persisted computing resource with a sufficient capacity to execute the client system process is determined at process block 220. If such a persisted computing resource is not included in the computing resources repository, an expandable computing resource to execute the client system process is determined at process block 225. If such an expandable computing resource is not included in the computing resources repository, a new computing resource with an ability to execute the client system process is rendered at process block 230. At process block 235, the retrieved computing resource is provisioned to the received resource request to execute the client system process. In an embodiment, the determined computing resource is configured to complement the resource request for executing the client system process.

Figure 3:
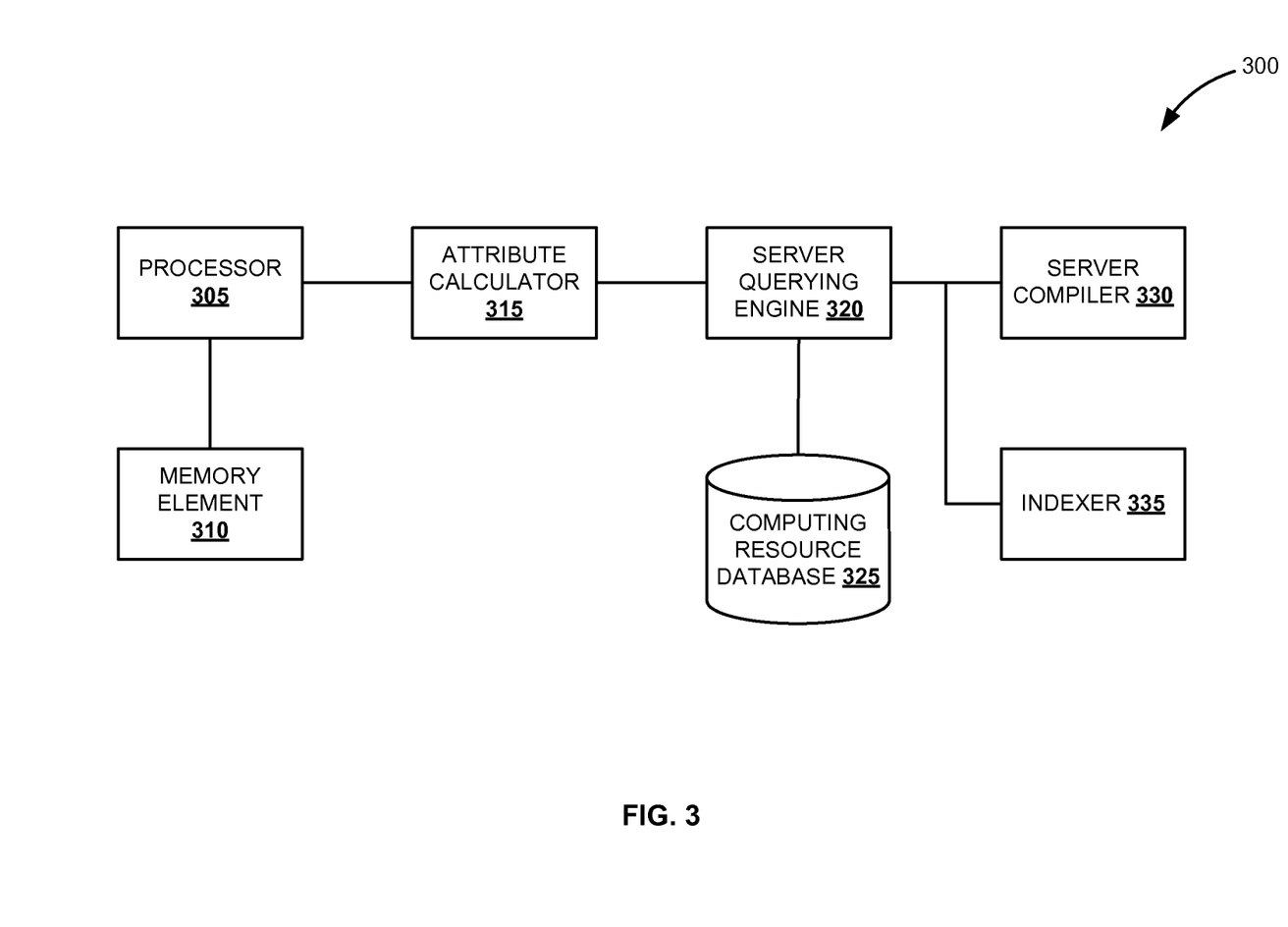
FIG. 3 is a block diagram illustrating a computer system to provision one or more computer resources on a computing network, according to an embodiment.

FIG. 3 is a block diagram illustrating a computer system to provision one or more computer resources on a computing network, according to an embodiment. Computer system 300 includes processor 305, memory element 310, attribute calculator 315, server querying engine 320, computing resource database 325, server compiler 330 and an indexer 335. In an embodiment, processor 305 is in communicator with memory element 310 and attribute calculator 315. Server querying engine 320 is in communication with attribute calculator 315, computing resource database 325, server complier 330 and indexer 335. In an embodiment, processor 305 is configured to read and execute instructions stored in memory element 310.

Upon receiving a resource request to execute a corresponding client system process, attribute calculator 315 calculates a system attribute. The system attribute is calculated based upon a resource request parameter associated with the resource request. Based upon the system attribute, computing resource database 325 is queried by server querying engine 320 to retrieve a computing resource. Retrieving the computing resource includes determining a persisted computing resource with a sufficient capacity to execute the client system process. If computing resource database 325 does not include a persisted resource, server querying engine 320 determines an expandable computing resource to execute the client system process. If computing resource database 325 does not include an expandable resource, server querying engine 320 renders a new computing resource to execute the client system process. Server compiler 330 assigns the retrieved computing resource to the received resource request, for the execution of the client system process.

In an embodiment, computer system 300 includes indexer 335 to index the computing resources present in the computing resource database 325 based upon one or more client parameters, and to render an index of the computing resource. Upon calculating the system attribute, indexer 335 instructs server querying engine 320 to query the index and retrieve an identification of a corresponding computing resource to execute the client system process. In another embodiment, indexer 335 indexes one or more resource templates, which is queried by server querying engine 320 to retrieve an identification of a corresponding resource template.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
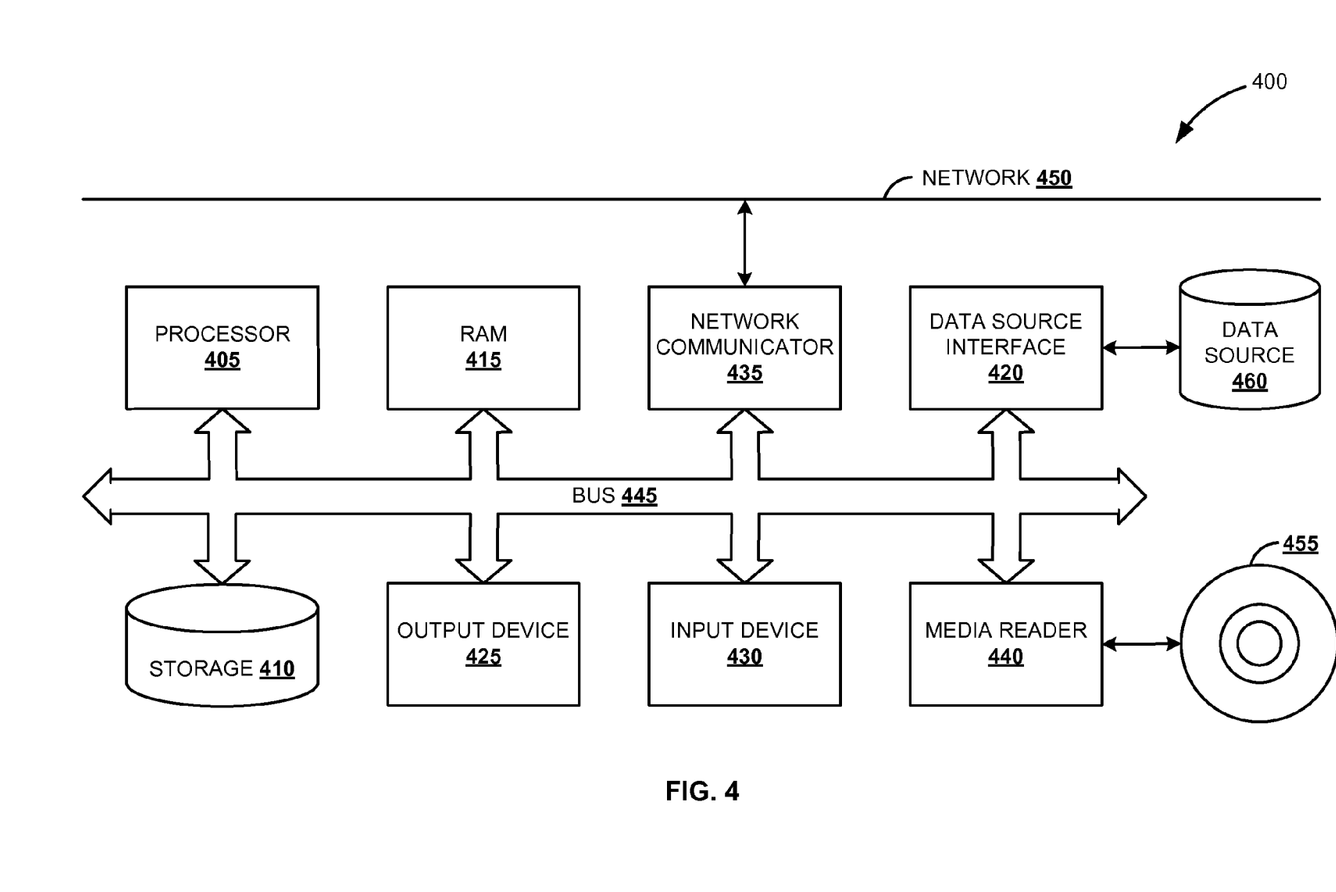
FIG. 4 is a block diagram illustrating an exemplary computer system, according to an embodiment.

FIG. 4 is a block diagram illustrating an exemplary computer system 400, according to an embodiment. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to render other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interacting with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, continuation servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transaction, hierarchical, multi-dimensional (e.g., OLAP), object oriented databases, and the like. Further data sources include tabular data (e.g., spreadsheets, delimited text files), data tagged with a markup language (e.g., XML data), transaction data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provision computer resources
    on a computing network, comprising:
    upon receiving a resource request, a processor of the computer calculating system attributes to execute a client system process associated with the received resource request;
    based upon the system attributes, querying a computing resources repository to retrieve a computing resource by:
        determining a persisted computing resource with a sufficient capacity to execute the client system process associated with the resource request;
        when the computing resources repository does not include the persisted computing resource, determining an expandable computing resource to execute the client system process associated with the resource request;
        when the computing resources repository does not include the expandable computing resource, rendering a new computing resource to execute the client system process associated with the resource request;
    provisioning the retrieved computing resource to the received resource request;
    calculating combinations of probable system requirements that occur within a range of system requirements included in the received resource request;
    constructing resource templates based upon the combinations of the probable system requirements;
    identifying a resource template corresponding to the retrieved computing resource and executing the client system process by:
        augmenting the resource template, for the expandable computing resource,
        determining the resource template with a capacity to execute the client system process, for the new computing resource, and
        determining conjoint resource templates to execute the client system process; and
    recognizing a non-functioning resource template and determining a substitute resource template for the non-functioning resource template.

2. The computer implemented method of claim 1, wherein the computing network includes a cloud based computing network.

3. The computer implemented method of claim 2 further comprising: a provisioning system receiving the resource request from a client system associated with the cloud based computing network, to determine a corresponding computing resource present in the computing resources repository to execute the client system process.

4. The computer implemented method of claim 1 further including:
    indexing one or more computing resources present in the computing resources repository based upon corresponding computing resource parameters, to render an index of the computing resources; and upon calculating the system attribute, querying the index to retrieve an identification of a corresponding computing resource present in the computing resources repository to execute the client system process.

5. The computer implemented method of claim 4, wherein querying the index comprises:
retrieving an identification of a corresponding resource template present in the computing resources repository to execute the client system process.

6. The computer implemented method of claim 1, wherein identifying the resource template includes:
determining a range of system requirements to retrieve access to the computing resource.

7. The computer implemented method of claim 1, wherein calculating the system attribute includes:
determining resource request parameters associated with the received resource request.

8. The computer implemented method of claim 1 further comprising:
identifying the resource template corresponding to the system attributes;
retrieving the computing resource corresponding to the system attributes; and
compiling the resource template and the computing resource to execute the client system process.

9. The computer implemented method of claim 1, wherein determining the expandable computing resource includes:
determining the expandable computing resource with a capability of augmenting the resource template available in the computing resources repository, to execute the client server process;
determining the corresponding resource template from the computing resources repository and provisioning the determined resource template and the associated expandable computing resource to the received resource request, to execute the client system process.

10. The computer implemented method of claim 1, further comprising rendering the new computing resource by determining the resource templates including resource requirements in the computing resources repository.

11. A computer system to provision computer resources on a computing network, comprising:
a processor configured to read and execute instructions stored in memory elements; and
the memory elements storing instructions to:
calculate, by an attribute calculator, a system attribute based upon a resource request parameter associated with a received resource request;
query, by a server querying engine, a computing resource database and retrieve a computing resource based upon the system attribute by—
determining a persisted computing resource with a sufficient capacity to execute a client system process;
when the computing resource database does not include the persisted computing resource, determining an expandable computing resource to execute the client system process;
when the computing resource database does not include the expandable computing resource, rendering a new computing resource system to execute the client system process;
calculate, by the server querying engine, combinations of probable system requirements that occur within a range of system requirements included in the received resource request and construct resource templates based upon the combinations of the probable system requirements;
assign, by a server complier, the retrieved computing resource to the received resource request;
identify, by an indexer, a resource template corresponding to the retrieved computing resource and execute the client system process by:
augmenting the resource template for the expandable computing resource,
determining the resource template with a capacity to execute the client system process for the new computing resource, and
determining conjoint resource templates to execute the client system process; and
recognize, by an indexer, a non-functioning resource template and determining a substitute resource template for the non-functioning resource template.

12. The computer system of claim 11, wherein the indexer is configured to:
index computing resources present in the computing resource database based upon corresponding computing resource parameters, to render an index of the computing resources; and
upon calculating the system attribute, to instruct the server querying engine to query the index and retrieve an identification of the corresponding computing resource to execute the client system process.

13. The computer system of claim 12, wherein the indexer is configured to:
retrieve an identification of a corresponding resource template present in the computing resources repository to execute the client system process.

14. The computer system of claim 11, wherein the indexer identifies the resource templates by:
determining a range of system requirements to retrieve access to the computing resource;
calculating combinations of probable system requirements that occur within the range of the system requirements; and
constructing the corresponding resource templates based upon the combinations of the probable system requirements.

15. The computer system of claim 11, wherein attribute calculator determines resource request parameters associated with the received resource request to calculate the system attributes.

16. The computer system of claim 11 further comprising:
the server to retrieve computing resource corresponding to the system attributes;
the indexer to identify the resource templates corresponding to the system attributes; and
the server compiler to compile the resource templates and the computing resource to execute the client system process.

17. An article of manufacture including a non-transitory computer readable storage medium to tangibly store instructions, which when executed by a computer, cause the computer to:
calculate system attributes based upon a resource request parameter associated with a received resource request;
query a computing resources repository based upon the system attributes to retrieve a computing resource by:
determining a persisted computing resource with a sufficient capacity to execute a client system process associated with the resource request;

when the computing resources repository does not include the persisted computing resource, determining an expandable computing resource to execute the client system process associated with the resource request;

when the computing resources repository does not include the expandable computing resource, rendering a new computing resource to execute the client system process associated with the resource request;

assign the retrieved computing resource to the received resource request, to provision computer resources associated with a computing network;

calculate combinations of probable system requirements that occur within a range of system requirements included in the received resource request;

construct resource templates based upon the combinations of the probable system requirements;

identify a resource template corresponding to the retrieved computing resource and execute the client system process by:

augmenting the resource template for the expandable computing resource, determining the resource template with a capacity to execute the client system process for the new computing resource, and determining conjoint resource templates to execute the client system process; and recognize a non-functioning resource template and determining a substitute resource template for the non-functioning resource template.

18. The article of manufacture of claim 17 further includes:

Indexing computing resources present in the computing resources repository based upon corresponding computing resource parameters, to render an index of the computing resources; and upon calculating the system attribute, querying the index to retrieve an identification of a corresponding computing resource present in the computing resources repository to execute the client system process.

19. The article of manufacture of claim 17 further includes:

determining the one or more resource templates corresponding to the system attributes;

determining the computing resources corresponding to the system attributes; and compiling the resource templates and the computing resources to execute the client system process.

20. The article of manufacture of claim 17 further includes:

determining a range of system requirements to retrieve access to the computing resource.

* * * * *